(12) United States Patent
Ugur

(10) Patent No.: US 12,528,373 B2
(45) Date of Patent: Jan. 20, 2026

(54) FORCE ASSISTED CHARGING ARRANGEMENT FOR SUPPLYING ELECTRICAL ENERGY TO AN ELECTRICAL VEHICLE

(71) Applicant: ABB E-mobility B.V., Delft (NL)

(72) Inventor: Ali Ugur, The Hague (NL)

(73) Assignee: ABB E-MOBILITY B.V., Delft (NL)

( * ) Notice: Subject to any disclaimer, the term of this patent is extended or adjusted under 35 U.S.C. 154(b) by 821 days.

(21) Appl. No.: 17/471,183

(22) Filed: Sep. 10, 2021

(65) Prior Publication Data

US 2022/0001760 A1   Jan. 6, 2022

Related U.S. Application Data

(63) Continuation of application No. PCT/EP2020/056431, filed on Mar. 11, 2020.

(30) Foreign Application Priority Data

Mar. 12, 2019   (EP) ..................... 19162307

(51) Int. Cl.
*B60L 53/35* (2019.01)
*B60L 53/16* (2019.01)
(Continued)

(52) U.S. Cl.
CPC ............... *B60L 53/35* (2019.02); *B60L 53/16* (2019.02); *B60L 53/18* (2019.02); *B60L 53/302* (2019.02);
(Continued)

(58) Field of Classification Search
None
See application file for complete search history.

(56) References Cited

U.S. PATENT DOCUMENTS

2011/0254504 A1* 10/2011 Haddad ............... B60L 53/37
                                                                320/109
2013/0078839 A1*  3/2013 Musk ................. H01R 13/631
                                                                439/345
(Continued)

FOREIGN PATENT DOCUMENTS

CN        205509450 U      8/2016
CN        108701513 A     10/2018
(Continued)

OTHER PUBLICATIONS

DE-102017122662-A1 Machine translation. (Year: 2025).*

(Continued)

*Primary Examiner* — David V Henze-Gongola
(74) *Attorney, Agent, or Firm* — McCarter & English, LLP

(57) ABSTRACT

A force assisted charging arrangement for supplying electrical energy to an electrical vehicle includes: a first set of bus bars arranged distant and fixed in respect to ground; a second set of bus bars having a first end and a second end, the first end being rotatably connected to the first set of bus bars so as to allow a rotation of the second end around a vertical rotation axis; a charging cable having a first charging cable end and a second charging cable end, the second charging cable end being connected to the second end of the second set of bus bars; and a charging connector connected to the first charging cable end.

17 Claims, 3 Drawing Sheets

(51) Int. Cl.
  *B60L 53/18* (2019.01)
  *B60L 53/30* (2019.01)
  *B60L 53/302* (2019.01)
  *H02J 7/00* (2006.01)
  *H02J 7/02* (2016.01)

(52) U.S. Cl.
  CPC .......... *B60L 53/305* (2019.02); *H02J 7/0045* (2013.01); *H02J 7/02* (2013.01)

(56) References Cited

U.S. PATENT DOCUMENTS

| | | | | |
|---|---|---|---|---|
| 2013/0134938 A1* | 5/2013 | Bianco | ............... | B60L 53/18 320/109 |
| 2015/0314695 A1* | 11/2015 | McGrath | ............... | B60L 5/36 320/109 |
| 2016/0288658 A1* | 10/2016 | Rudolph | ............... | B60L 53/11 |
| 2019/0385765 A1* | 12/2019 | Lyon | ............... | H01B 7/423 |
| 2021/0094436 A1* | 4/2021 | Weber | ............... | G06Q 20/382 |

FOREIGN PATENT DOCUMENTS

| | | | |
|---|---|---|---|
| DE | 102009024721 A1 * | 12/2010 | .......... B60L 11/1818 |
| DE | 102014109068 A1 | 12/2015 | |
| DE | 202017100174 U1 | 4/2017 | |
| DE | 102017122662 A1 * | 4/2019 | |
| EP | 3312045 A1 | 4/2018 | |
| WO | WO 2018/014721 A1 | 1/2018 | |

OTHER PUBLICATIONS

European Patent Office, International Preliminary Report on Patentability in International Patent Application No. PCT/EP2020/056431, 7 pp. (Aug. 25, 2021).

European Patent Office, International Search Report in International Patent Application No. PCT/EP2020/056431, 4 pp. (Jun. 8, 2020).

European Patent Office, Written Opinion in International Patent Application No. PCT/EP2020/056431, 6 pp. (Jun. 8, 2020).

European Patent Office, Extended European Search Report in European Patent Application No. 19162307.3, 7 pp. (Oct. 4, 2019).

* cited by examiner

FORCE ASSISTED CHARGING ARRANGEMENT FOR SUPPLYING ELECTRICAL ENERGY TO AN ELECTRICAL VEHICLE

CROSS-REFERENCE TO PRIOR APPLICATION

This application is a continuation of International Patent Application No. PCT/EP2020/056431, filed on Mar. 11, 2020, which claims priority to European Patent Application No. EP 19162307.3, filed on Mar. 12, 2019. The entire disclosure of both applications is hereby incorporated by reference herein.

FIELD

The invention relates to a charging arrangement for supplying electrical energy to an electrical vehicle, comprising a charging cable having a first charging cable end and a charging cable second end and a charging connector connected to the first charging cable end. The invention further relates to an electric vehicle charge equipment, EVSE, comprising the force assisted charging arrangement and configured for connecting to an AC grid.

BACKGROUND

Electric vehicle, EV, direct current, DC, fast charging systems and methods often use a so-called Combined Charging System, CCS, protocol according to IEC 61851-23 and SAE J1772 standard for charging electrical vehicles both in the US and in the European Union, EU. As charge currents increase, liquid cooled charging cables for connecting an Electric Vehicle Supply Equipment, EVSE, via a charging connector with the electrical vehicle are becoming more commonly used. High power charging requires charging cables which can carry 500 A current at a voltage of 1000V. The liquid cooling allows conductors within the charging cable to become thinner, and thereby easier to use, because excessive heat due to high charge currents and charging cable internal resistances is taken care of.

A drawback of liquid cooled charging cables is that the charging cable becomes very stiff and heavy. In addition, weight of such high-power liquid cooled charging cables is increasing and is becoming too much for an ordinary person to handle. Besides that, charging connectors are vulnerable components that are easily damaged if dropped or handled incorrectly and cooled charging cables only offer limited extensions to those power levels. Therefore, robotic systems have been developed for overcoming these disadvantages. However, such robotic systems are expensive and potentially dangerous for humans being too close to such robotic arms.

SUMMARY

In an embodiment, the present invention provides a force assisted charging arrangement for supplying electrical energy to an electrical vehicle, comprising: a first set of bus bars arranged distant and fixed in respect to ground; a second set of bus bars having a first end and a second end, the first end being rotatably connected to the first set of bus bars so as to allow a rotation of the second end around a vertical rotation axis; a charging cable having a first charging cable end and a second charging cable end, the second charging cable end being connected to the second end of the second set of bus bars; and a charging connector connected to the first charging cable end.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
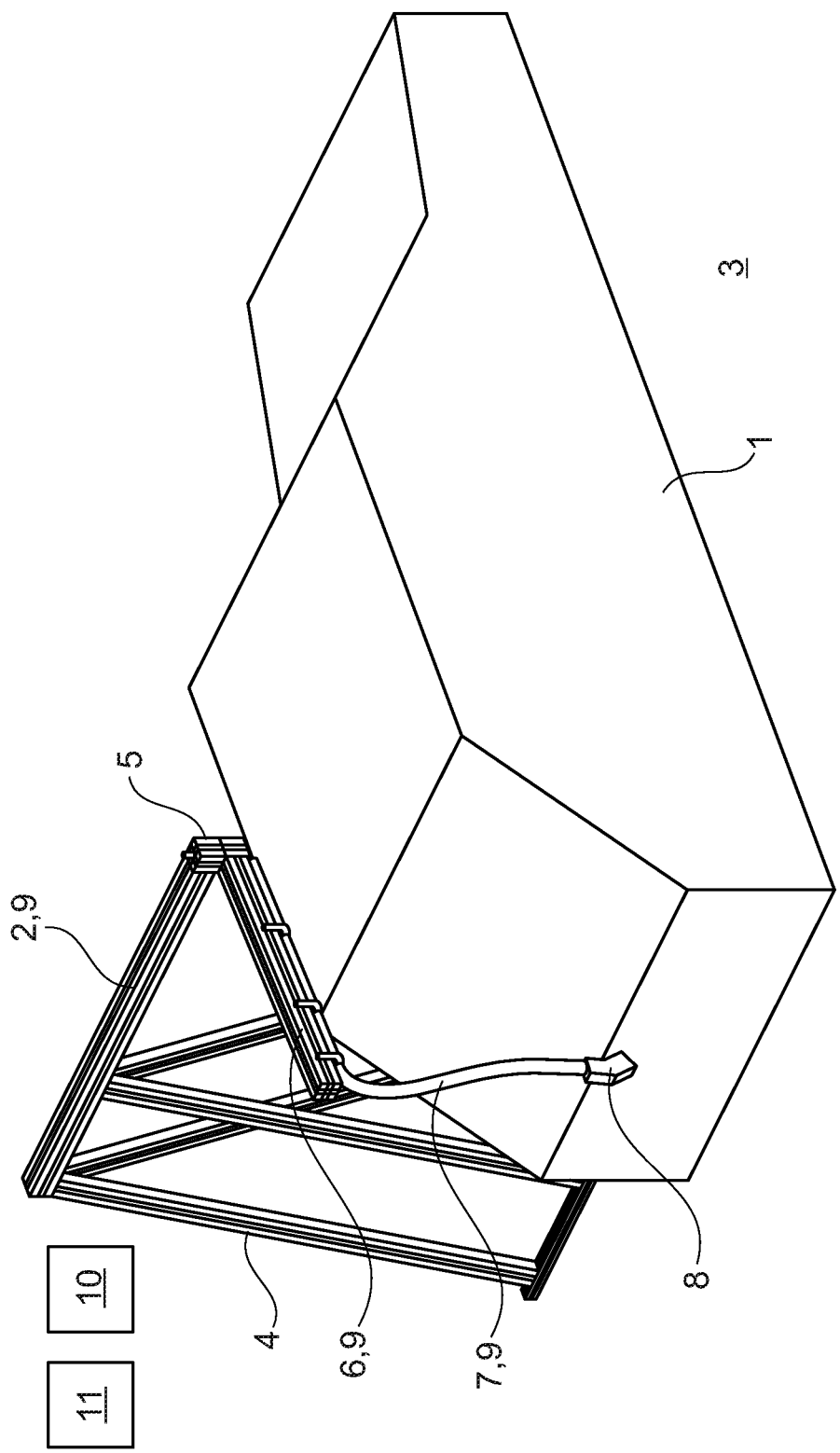
FIG. 1 shows a force assisted charging arrangement for supplying electrical energy to an electrical vehicle according to a preferred embodiment in a perspective schematic view.

In an embodiment, the present invention provides a charging arrangement for connecting a liquid cooled charging cable to an electrical vehicle in a simple, cheap and secure manner independent of the weight and stiffness of the charging cable.

In an embodiment, the present invention provides a force assisted charging arrangement for supplying electrical energy to an electrical vehicle via a first set of bus bars and a second set of bus bars, comprising
  the first set of bus bars arranged distant and fixed in respect to ground,
  the second set of bus bars having a first end and a second end, the first end connected rotatable to the first set of bus bars thereby allowing a rotation of the second end around a vertical rotation axis,
  a charging cable having a first charging cable end and a second charging cable end, the second charging cable end connected to the second end of the second set of bus bars, and
  a charging connector connected to the first charging cable end.

It is therefore a key point of the invention to provide a force assisted charging arrangement which absorbs weight of the charging cable thereby providing easy handling and connectability to different types of electrical vehicles independent of the weight and stiffness of the charging cable. As the charging cable is attached to the second set of bus bars and thus preferably hold above ground, a human connecting the charging cable via the charging connector to the electrical vehicle does not need to lift the cable from ground for connecting the cable to the electrical vehicle. Such way lifting a heavy and stiffy charging cable can be completely avoided.

The length of the charging cable is preferably dimensioned such that the first charging cable end respectively the charging connector is arranged adjacent to a socket of the electrical vehicle, into which the charging connector can be plugged for charging the electrical vehicle with electrical energy. Due to gravity, the charging cable will hang down from the second set of bus bars and thus extend in vertical direction. Preferably, the charging cable is dimensioned such that neither the charging cable nor the charging connector hanging down from the second set of bus bars touches ground. Preferably, the charging cable is provided length-adjustable. Such way charging sockets having different heights in respect to ground can be connected without lifting the charging connector.

As the charging cable and the charging connector are rotatable around the vertical rotation axis, the charging connector can be easily rotated from one side to another side in respect to the electrical vehicle. Thus, charging sockets provided on an arbitrary side of an electrical vehicle can be connected by the charging connector without having the need to lift the charging connector or to move the charging cable over ground from one side to another side of the electrical vehicle. As due to the proposed solution weight of the charging cable does not matter anymore, and as the charging cable can be preferably freely rotated in respect to the first set of bus bars, even liquid cooled charging cables that are very stiff and heavy can be easily handled by any human with the proposed force assisted charging arrangement.

The bus bars and/or the charging cable preferably comprise DC conductors having a diameter of $\geq 25$ mm$^2$, 50 mm$^2$ or 70 mm$^2$ and/or a length of $\geq 4$ m, 5 m or 7.5 m and $\geq 5$ m, 7.5 m or 10 m and/or are dimensioned for supplying in particular DC currents up to 500 A or more at a DC voltage of 1000V or more. The electrical vehicle can be provided as an electrical car, an ebus, a truck or any other electrical vehicle means.

In a preferred implementation the second end is rotatable around 360° around the first end. Such way it does not matter on which side of the electrical vehicle the charging socket is provided as the charging cable and the charging connector can be easily rotated towards a suitable position in regard the electrical vehicle. Preferably, the second set of bus bars can be rotated in a plane parallel to ground and/or in horizontal direction.

In another preferred implementation the first set of bus bars and/or the second set of bus bars are provided as linear arms and/or extend in horizontal direction. The bus bars preferably comprise a linear extension of 2, 3, 4 or 5 meters and/or extend parallel to each other. In a further preferred implementation, the first end is connected rotatable to the first set of bus bars via a joint. The joint preferably comprises conductors for connecting the respective bus bars of the first set of bus bars and the second set of bus bars.

In another preferred implementation the force assisted charging arrangement comprises a communication cable, which runs parallel to the first and a second set of bus bars and is connected to the charging connector. The communication cable may comprise further conductors, such as, for example, a Proximity Pilot, PP, line for a PP signal, a Control Pilot, CP, line for a CP signal line and/or a PE line for a PE signal. PP line, CP line and/or PE line and respectively signalling are preferably implemented according to the so-called Combined Charging System, CCS, protocol, in particular according to IEC 61851 or IEC 61851-23 standard. In a further preferred implementation, the communication cable is integrated within the charging cable.

In another preferred implementation, the charging cable and/or the charging connector is liquid cooled. For cooling the charging cable and/or the charging connector, a cooling device can be provided, which is preferably arranged at an EVSE as described below and/or which is configured that the cooling liquid is conveyed from a first end to a second, opposite end of the charging cable towards the charging connector, and thereafter from the second end to the first end. The cooling liquid is preferably provided as an oil-based coolant thereby allowing that the cooling liquid comes into contact with unshielded copper conductors of the charging cable.

In a further preferred implementation, the charging connector is provided as reverse plug. Provided as a reverse plug means preferably that the charging connector comprises, when plugged into the electrical vehicle, a bending upward so that the charging cable is inserted in vertical manner from above into the charging connector. Providing the charging connector as reverse plug simplifies handling when plugging the charging connector into the charging socket.

In another preferred implementation the first set of bus bars and the second set of bus bars each comprise two or at least two bus bars and/or whereby the bus bars are isolated. Preferably, the joint comprises a respective number of conductors for connecting the respective bus bars of the first set of bus bars and the second set of bus bars. Further preferably, the bus bars isolated from each other.

In a further preferred implementation, the force assisted charging arrangement comprises a support frame arranged on ground, which holds the first set of bus bars arranged distant and fixed in respect to ground. The support frame preferably comprises a hollow frame. Further preferably, the support frame comprises two triangles, which are arranged parallel and distant to each other with each one side attached to ground. The first set of two bus bars is preferably attached with one end to corners of the triangles opposite to ground thereby extending in linear direction. Preferably the support frame is dimensioned such that the electrical vehicle can be parked at least partly underneath the bus bars. Alternatively, the support frame and/or the first set of bus bars can be attached to or underneath a roof or any other overhang.

In another preferred implementation the force assisted charging arrangement comprises the electrical vehicle, whereby the first set of bus bars and the second set of bus bars are arranged above the electrical vehicle such that the electrical vehicle can drive underneath the first set of bus bars and the second set of bus bars. Such way charging of the electrical vehicle becomes very easy as the electrical vehicle simply needs to be parked underneath the first set of bus bars. Once parked, the second set of bus bars is rotated until the charging cable and the charging connector rest close to charging socket of the electrical vehicle. Finally, the charging connector is plugged into the charging socket such that charging can start.

The object is further solved by an electric vehicle charge equipment, EVSE, comprising the force assisted charging arrangement as described before and configured for connecting to an AC grid. The EVSE may comprise a transformer and/or a converter for connecting to respectively receiving electrical energy from the AC grid, which is transformed and/or converted to DC for being supplied to the first set of bus bars.

In another preferred implementation the EVSE is configured for charging the electrical vehicle by using a Combined Charge System, CCS, protocol according to IEC 61851-23 and/or SAE J1772 standard and/or whereby the charging connector and/or the charging cable are provided according to IEC 62196 standard. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is controlled by the so called CharIN consortium.

Besides other protocols such as, for example, CHAdeMO, as abbreviation of CHArge de Move, or GB/T, in particular according to 20234.3-2011 standard, can also be used with the described EVSE respectively the method. The EVSE and the charging arrangement are applicable to different type of electrical vehicles, including for examples electrical busses. Preferably, the EVSE and/or the charging arrangement is configured for charging the electrical vehicles with a DC input voltage up to 1500 V DC.

Figure 2:
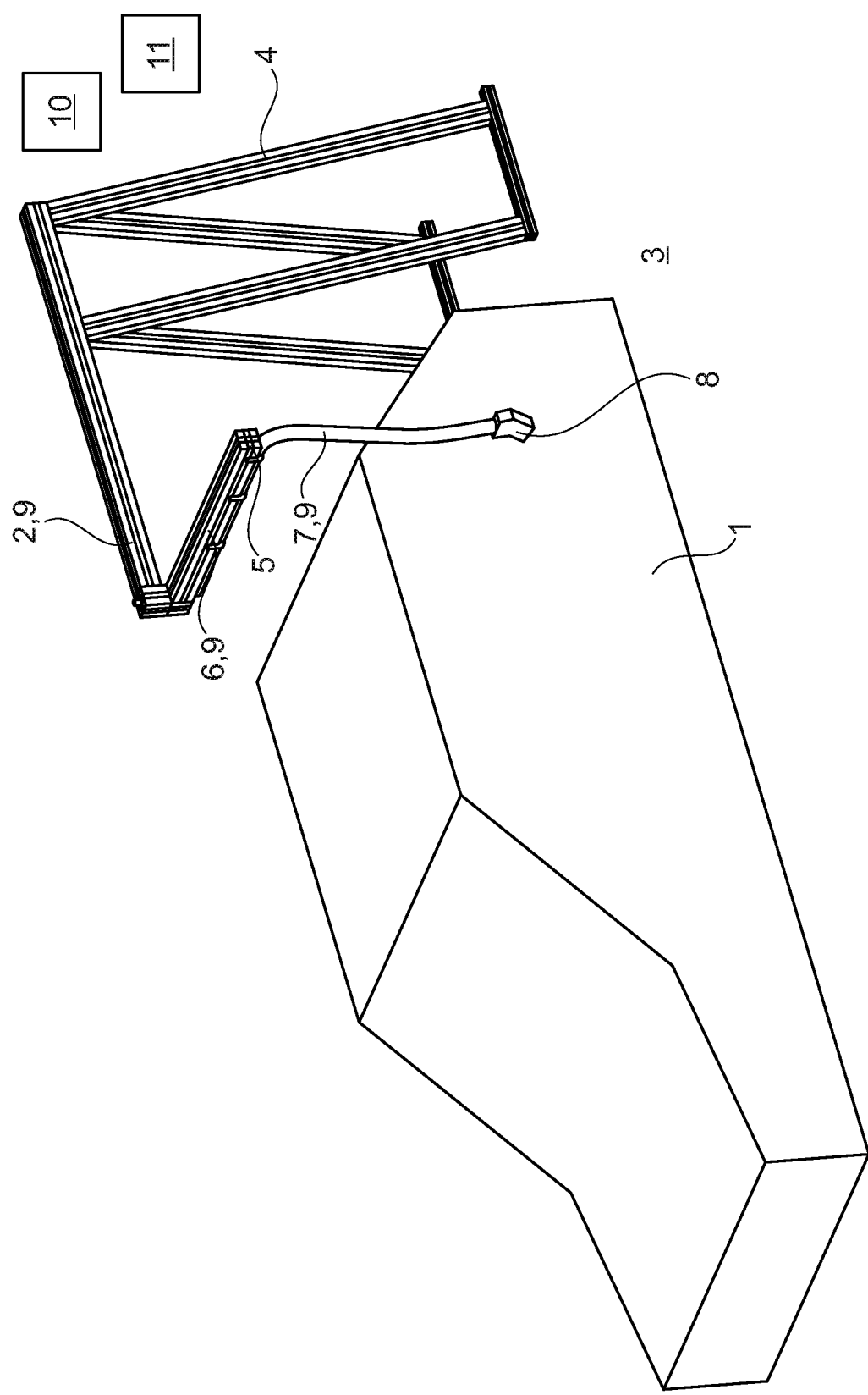
FIG. 2 shows the force assisted charging arrangement according to FIG. 1 in another perspective schematic view.
Figure 3:
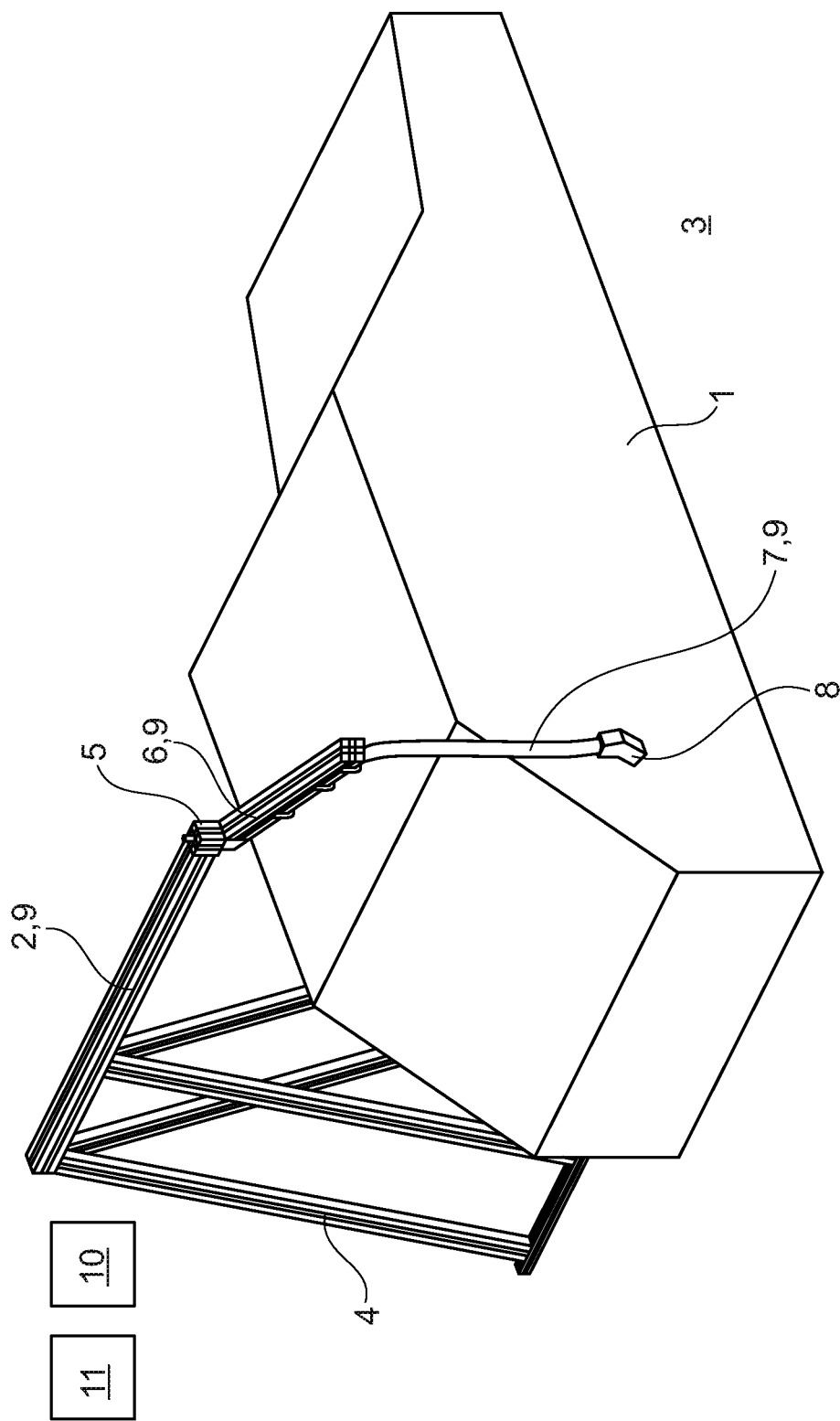
FIG. 3 shows the force assisted charging arrangement according to FIG. 2 in another perspective schematic view.

FIGS. 1 to 3 show a force assisted charging arrangement for supplying electrical energy to an electrical vehicle 1 according to a preferred embodiment in different perspective schematic views. The charging arrangement comprises a first set of two linear bus bars 2, which are arranged distant and fixed in respect to ground 3 on a hollow support frame 4. The support frame 4 comprise two triangles arranged parallel and distant to each other with each one side on ground 3. The first set of two bus bars 2 is attached with one end to corners of the triangles opposite to ground 3 thereby extending in linear direction such that the electrical vehicle 1 can be positioned underneath the other opposite end of the first set of two linear bus bars 2. The first set of bus bars 2 comprises a linear extension between the opposite ends of 4 meters.

At the other opposite end, a joint 5 is provided for rotatably connecting the first set of bus bars 2 with a second set of two linear bus bars 6, of which a first end is attached to the joint 5. Such way the second set of bus bars 6 extend horizontal in respect to ground 3, whereby a second opposite end of the second set of bus bars 6 is rotatable by 360° around a rotation axis extending in vertical direction and defined by the joint 5, as can be seen from FIGS. 2 and 3 showing the second opposite end in different positions. The second set of bus bars 6 comprises a linear extension between the first and second end of 2 meters and is provided as an arm. Both the first set of bus bars 2 and the second set of bus bars 6 comprise two bus bars for supplying DC current to the electrical vehicle 1, whereby the respective bus bars are isolated from each other.

The charging arrangement further comprises a liquid cooled charging cable 7 having a first charging cable end and a second charging cable end. The second charging cable end is connected to the second end of the second set of bus bars 6. Due to gravity and weight of the liquid cooling, the liquid cooled charging cable 7 "hangs" down from the second end of the second set of bus bars 6 in a vertical manner and comprises a length such that a charging connector 8 connected to the first charging cable end can be easily plugged by a human into a respective socket of the electrical vehicle 1 without the need to lift the charging connector 8. For facilitating easy connection, the charging connector 8 is provided as a reverse plug. Provided as a reverse plug means that the charging connector 8 comprises, when plugged into the electrical vehicle 1, a bending upward such that the charging cable 7 is inserted in vertical manner from above into the charging connector 8.

The first set of bus bars 2, the second set of bus bars 6, the liquid cooled charging cable 7 and liquid cooled charging connector 8 are dimensioned to charge the electrical vehicle with a current of 500 A DC at a voltage if 1000V DC. For exchanging charging information between the electrical vehicle 1, a communication cable 9 is provided, which runs parallel to the first and to the second set of bus bars 2, 6 and is connected to the charging connector 8. The communication cable 9 is integrated into the charging cable 7 as additional conductors to the conductors carrying the charging currents.

For receiving electrical energy to charge the electrical vehicle 1 with a respective DC current, the charging arrangement is connected to an electric vehicle charge equipment, EVSE, 10. The EVSE 10 is connected via a transformer and a converter to an AC grid 11. The EVSE 10 is configured for charging the electrical vehicle 1 by using a Combined Charge System, CCS, protocol according to IEC 61851-23 and/or SAE J1772 standard, thereby allowing said charging currents of 500 A DC or more at 1000V DC or more. In an equal manner the charging connector 8 and the charging cable 7 are provided according to IEC 62196 standard.

The proposed solution provides a force compensating mechanism that provides for an easy and simple possibility for connecting the charging connector 8 to different types of electrical vehicles 1 without having the need of lifting a heavy and stiff charging cable 7. As the second set of bus bars 6 in form of an arm can freely rotated by 360° in respect to the first set of bus bars 2, it does not matter on which side of the electrical vehicle 1 the charging socket is provided. For connecting the charging connector 8 to the electrical vehicle 1, the second set of bus bars 6 is rotated around the electrical vehicle until the charging connector 8 becomes close to the charging socket.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS LIST 1 electrical vehicle
2 first set of bus bars
3 ground
4 support frame
5 joint
6 second set of bus bars
7 charging cable
8 charging connector
9 communication cable
10 Electric vehicle charge equipment
11 AC grid

What is claimed is:

1. A force assisted charging arrangement for supplying electrical energy to an electrical vehicle, the charging arrangement comprising:
   a first set of bus bars arranged distant and fixed in respect to ground;
   a second set of bus bars having a first end and a second end, the first end being rotatably connected to the first set of bus bars via a joint so as to allow a rotation of the second end around a vertical rotation axis, the joint comprising conductors for connecting the respective bus bars of the first set of bus bars and the second set of bus bars, the first set of bus bars are in electrical communication with the second set of bus bars and the first set of bus bars and the second set of bus bars are dimensioned for supplying DC currents up to 500 A at a DC voltage of 1000V;
   a charging cable having a first charging cable end and a second charging cable end, the second charging cable end being connected to the second end of the second set of bus bars;
   a charging connector connected to the first charging cable end; and
   a communication cable that runs parallel to the first set of bus bars and to the second set of bus bars and is connected to the charging connector, wherein the communication cable comprises conductors including a proximity pilot line.

2. The force assisted charging arrangement of claim 1, wherein the second end is rotatable around 360° around the first end.

3. The force assisted charging arrangement of claim 1, wherein the first set of bus bars and/or the second set of bus bars comprise linear arms and/or extend in a horizontal direction.

4. The force assisted charging arrangement of claim 1, wherein the communication cable is integrated within the charging cable.

5. The force assisted charging arrangement of claim 1, wherein the charging cable and/or the charging connector is liquid cooled.

6. The force assisted charging arrangement of claim 1, wherein the charging connector comprises a reversed plug, wherein the reversed plug, when plugged into the electrical vehicle, is bending upward so that the charging cable is inserted in a vertical manner from above into the charging connector.

7. The force assisted charging arrangement of claim 1, further comprising:
   a support frame arranged on ground and which holds the first set of bus bars arranged distant and fixed in respect to ground.

8. The force assisted charging arrangement of claim 1, further comprising:
   the electrical vehicle,
   wherein the first set of bus bars and the second set of bus bars are arranged above the electrical vehicle such that the electrical vehicle is drivable underneath the first set of bus bars and the second set of bus bars.

9. An electric vehicle charge equipment (EVSE), comprising:
   the force assisted charging arrangement of claim 1,
   wherein the force assisted charging arrangement is configured to connect to an AC grid.

10. The EVSE of claim 9, wherein the EVSE is configured to charge the electrical vehicle by using a Combined Charge System (CCS) protocol according to IEC 61851-23 and/or SAE J1772 standard, and/or
    wherein the charging connector and/or the charging cable are provided according to IEC 62196 standard.

11. The EVSE of claim 9, wherein the EVSE is configured to charge the electrical vehicle that has a DC input voltage up to 1500V.

12. The force assisted charging arrangement of claim 3, wherein the bus bars comprise a linear extension of between about 6.56 feet (2 meters) to about 16.40 feet (5 meters).

13. The force assisted charging arrangement of claim 1, wherein the first set of bus bars and the second set of bus bars each comprise two or at least two bus bars, wherein the bus bars are isolated.

14. The force assisted charging arrangement of claim 1, wherein the charging cable is length-adjustable.

15. The force assisted charging arrangement of claim 5, wherein the cooling liquid is an oil-based coolant.

16. The force assisted charging arrangement of claim 1, wherein the bus bars and/or the charging cable further comprise DC conductors having a diameter greater than or equal to about 0.98 in$^2$ (25 mm$^2$) and/or a length greater than or equal to about 13.10 feet (4 meters).

17. The EVSE of claim 9 further comprising a cooling device which is configured to convey a cooling liquid from the first charging cable end to the second charging cable end of the charging cable, and from the second charging cable end to the first charging cable end of the charging cable.

* * * * *